(12) United States Patent
Thomas

(10) Patent No.: US 11,825,070 B1
(45) Date of Patent: Nov. 21, 2023

(54) INTRINSIC PARAMETER CALIBRATION SYSTEM

(71) Applicant: ASMPT AEi, Inc., Tewksbury, MA (US)

(72) Inventor: John Thomas, Arlington, MA (US)

(73) Assignee: ASMPT AEI, INC., Tewksbury, MA (US)

( * ) Notice: Subject to any disclaimer, the term of this patent is extended or adjusted under 35 U.S.C. 154(b) by 0 days.

(21) Appl. No.: 18/100,062

(22) Filed: Jan. 23, 2023

(51) Int. Cl.
  *H04N 17/00* (2006.01)
  *G06T 7/80* (2017.01)
  *G02B 17/08* (2006.01)

(52) U.S. Cl.
  CPC ........... *H04N 17/002* (2013.01); *G02B 17/08* (2013.01); *G06T 7/80* (2017.01); *G06T 2207/30244* (2013.01)

(58) Field of Classification Search
  CPC .................... H04N 17/002; G06T 7/80; G06T 2207/30244; G02B 17/08
  See application file for complete search history.

(56) References Cited

U.S. PATENT DOCUMENTS

| | | | | |
|---|---|---|---|---|
| 7,058,239 | B2* | 6/2006 | Singh | G02B 13/06 382/284 |
| 10,412,365 | B2* | 9/2019 | Zhang | G06T 7/80 |
| 10,839,560 | B1* | 11/2020 | Goesele | G06T 7/97 |
| 11,283,978 | B1* | 3/2022 | Lee | H04N 17/002 |
| 11,695,915 | B1* | 7/2023 | Sze | H04N 23/54 348/40 |
| 2004/0081445 | A1* | 4/2004 | Miyoshi | H04N 13/254 396/324 |
| 2013/0222605 | A1* | 8/2013 | Rukes | H04N 17/002 348/E17.002 |
| 2016/0014405 | A1* | 1/2016 | Beckman | H04N 23/67 348/187 |
| 2017/0280135 | A1* | 9/2017 | Shroff | G06T 7/80 |
| 2020/0412954 | A1* | 12/2020 | Gaizman | H04N 23/689 |

* cited by examiner

*Primary Examiner* — Brian P Yenke
(74) *Attorney, Agent, or Firm* — OSTROLENK FABER LLP

(57) ABSTRACT

A measurement system for measuring intrinsic parameters of a camera includes an arrangement of inclined mirrored surfaces to extend the field of view of the camera.

14 Claims, 4 Drawing Sheets

INTRINSIC PARAMETER CALIBRATION SYSTEM

BACKGROUND AND PRIOR ART

The present invention relates to the measurement of intrinsic parameters of a camera (i.e. parameters associated with the camera itself, as opposed to 'extrinsic parameters', which relate for example to the attitude or position of the camera). Such intrinsic parameter measurement can determine whether a camera under test meets a required quality threshold, and may also be used for subsequent calibration or correction of the camera.

In conventional intrinsic parameter measurement systems, an optical target having optically identifiable features is used, with the measurement process requiring precise knowledge of the location of the features with respect to the camera being measured. There are three main methods for performing intrinsic parameter measurement, but each has associated drawbacks:

i) Zhang Method

This method involves using an optical target, typically taking the form of a flat checkerboard, and moving it around within the field of view of the camera while acquiring images (or moving the camera relative to the checkerboard). By knowing the exact dimensions of the checkerboard, the intrinsic parameters can be extracted from the images. The exact position of the checkerboard relative to the camera is not required to perform this measurement. This method does not involve an intermediate lens, i.e. a lens positioned in the optical path between the camera and the optical target.

The Zhang method requires taking several images of the checkerboard while either moving the camera or the checkerboard. However, moving the board or camera and taking multiple images can make the throughput of systems applying this method very slow. The space requirements for this kind of system can also be very large for cameras with large fields of view, as the checkerboard needs to be in good focus and must extend across the whole field of view.

ii) Multiple Target Setups

This approach uses a series of flat optical targets located in different positions in six degrees of freedom. By knowing the exact position of the targets relative both to each other and to the camera, the intrinsic parameters of the camera can be measured. This measurement also does not require an intermediate lens.

Such multiple target setups typically only require one image to be taken, so it does not suffer the same throughput issue as the Zhang method. However, the targets are difficult to configure for a variety of fields of view and focus distances. For example, a configuration that works satisfactorily for a 28 degree field of view camera often will not work for a 200 degree field of view camera. The multiple targets will therefore need to be set at different positions for different cameras, and, at least for some cameras, can require a significant amount of space, typically up to several square meters.

iii) Intermediate Lens Approach

This approach involves using an intermediate lens positioned in the optical path between the camera and the optical target to project an image of the optical target to the camera. This requires either some calibration, or use of a diffraction grid, beneath the intermediate lens (i.e. in the optical path between the intermediate lens and the camera) to know the exact positions of the features of the optical target. Once the positions of those features are known, intrinsic parameter measurement can be performed.

Such an approach can be performed by taking a single image, and furthermore the measurement apparatus can be kept relatively small since they can adjust to the focus distance of the camera under test. However, such systems are limited to the field of view of the intermediate lens. Typically this can extend up to 120 degrees, but fisheye cameras for example can be very difficult to calibrate using this method.

The present invention seeks to provide a measurement system for intrinsic parameters of a camera which overcomes the problems outlined above.

In accordance with the present invention this aim is achieved by adopting an intermediate lens-based system, with additional optical components to extend the field of view of the intermediate lens.

SUMMARY OF THE INVENTION

In accordance with a first aspect of the present invention there is provided apparatus for measuring intrinsic parameters of a camera, the camera having a field of view centered about an optical axis of the camera, the apparatus comprising:
  a positioning means for locating the camera at a measurement location,
  a target surface, spaced from the camera at its measurement location along an optical path and arranged to at least partially extend across the camera's field of view,
  a lens located in the optical path between the camera at its measurement location and the target surface, and
  a mirrored surface which is inclined to the optical axis such that a light ray travelling from the target surface, then through the lens, may be reflected by the mirrored surface to reach and be imaged by the camera at its measurement location.

In accordance with a second aspect of the present invention there is provided a method for measuring intrinsic parameters of a test camera, the test camera having a field of view centered about an optical axis of the test camera, comprising the steps of:
  i) locating the test camera at a measurement location,
  ii) providing:
    a target surface, spaced from the test camera at its measurement location along an optical path and arranged to at least partially extend across the test camera's field of view,
    a lens located in the optical path between the test camera at its measurement location and the target surface, and
    a mirrored surface which is inclined to the optical axis, such that a light ray travelling from the target surface, then through the lens, may be reflected by the mirrored surface to reach and be imaged by the test camera at its measurement location, and
  iii) using the test camera to image light rays travelling from the target surface, then through the lens to the test camera.

In accordance with a third aspect of the present invention there is provided a method for measuring intrinsic parameters of a camera, using the apparatus of the first aspect.

Other specific aspects and features of the present invention are set out in the accompanying claims.

BRIEF DESCRIPTION OF THE DRAWINGS

The invention will now be described with reference to the accompanying drawings (not to scale), in which.

DETAILED DESCRIPTION OF THE PREFERRED EMBODIMENTS OF THE INVENTION

Figure 1:
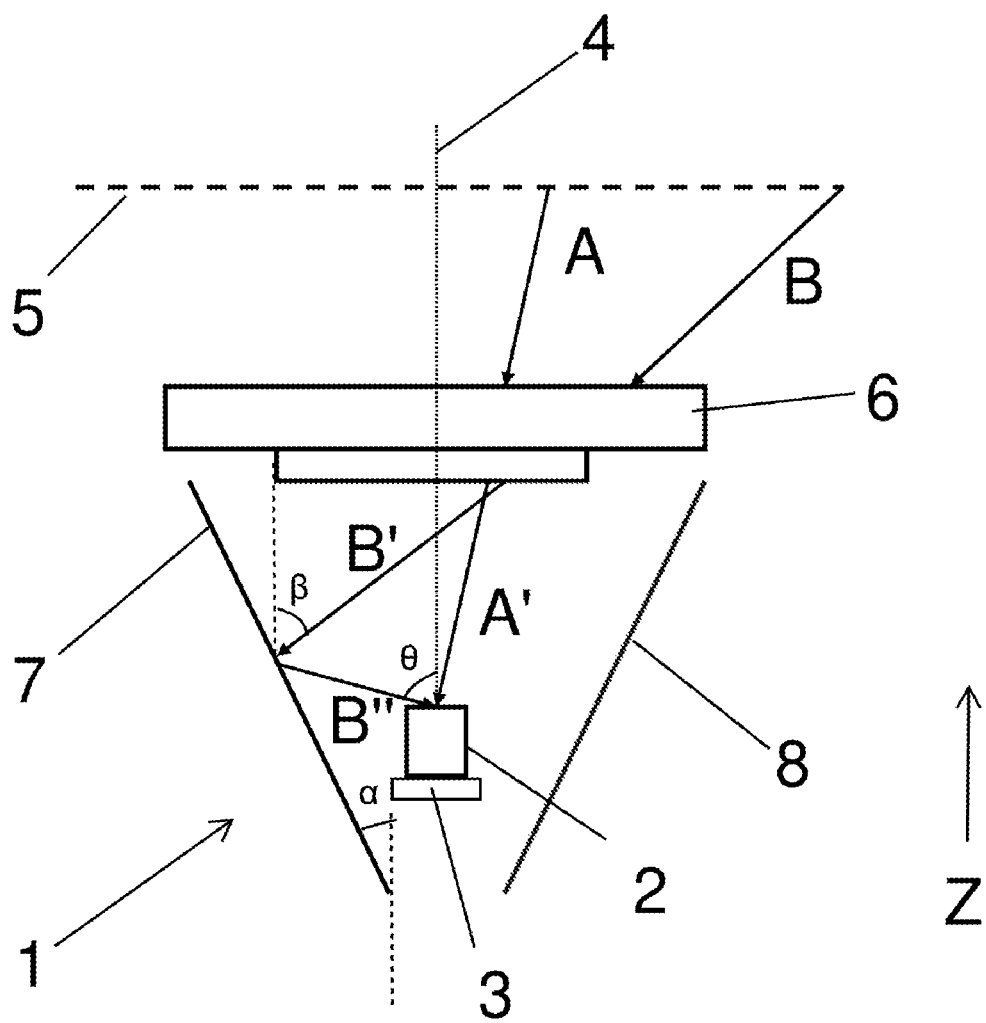
FIG. 1 schematically shows, in a sectional side view, measurement apparatus according to an embodiment of the present invention.

FIG. 1 schematically shows, in a sectional side view, measurement apparatus 1 according to an embodiment of the present invention. A test camera 2, i.e. a camera that is to be tested by the measurement apparatus 1, is located at a measurement location by a positioning means, in this case a support 3. In the embodiment shown, the camera 2 is arranged with its field of view extending upwardly as shown, with its optical axis 4, about which the field of view is centered, being arranged parallel to a vertical Z axis shown. The field of view may be relatively wide, especially if the test camera 2 comprises a fish-eye lens for example. A target surface 5, which may include a variety of optically-identifiable features, such as a checkerboard target (see FIG. 4 for example) is held spaced from the test camera 2 at its measurement location along an optical path (see below) and arranged to at least partially extend across the test camera's field of view. Similarly to the 'Intermediate Lens Approach' described above, a lens 6 is located in the optical path between the test camera 2 at its measurement location and the target surface 5. This lens 6 may for example have a field of view of between 90 and 1500, advantageously around 120. The lens 6 ideally has a flat field curvature, meaning that it keeps the entire flat target surface 5 near infinity focus, instead of being out of focus at the edges. By way of example only, a suitable, commercially available lens that may be used as lens 6 is the collimator lens CL-1223C designed by OneStone. This is a two-piece lens, hence in FIG. 1 lens 6 is also shown as comprising two parts.

The lens 6 is used to project the image of the target surface 5 to infinity. One of the challenges of intrinsic parameter measurement is separating the extrinsic parameters, the position of the calibration features relative to the test camera 2, from the intrinsic parameters of the test camera 2. By projecting the image of the target to infinity, the image of the target surface 5 remains fixed in translational degrees of freedom. The only impacts to the image arise from rotational extrinsic parameters and the intrinsic parameters of the test camera 2. The positions of features on the target surface 5 may be calibrated (see below) using a reference camera (not shown) that has been accurately measured outside the system. Using the positions of those features, the intrinsic parameters of the test camera 2 can be measured by capturing one image of the target.

In addition, at least one mirrored surface, with two such mirrored surfaces 7, 8 being shown in FIG. 1, are provided. These are each inclined to the optical axis 4 such that a light ray travelling from the target surface 5, then through the lens 6, may be reflected by the mirrored surface 7, 8 to reach and be imaged by the test camera 2 at its measurement location. In particular, a light ray such as B shown in FIG. 1, which travels from an outer region of the target surface 5 which is outside the test camera 2's normal field of view, and therefore may be referred to as an 'outer light ray', which is spaced from the optical axis 4, then through lens 6 (transmitted shown as B') is reflected by the mirrored surface 7 (reflected ray shown as B") to reach the test camera 2. In contrast, an 'inner light ray' such as A shown in FIG. 1, which travels from a central region of the target surface 5 proximate the optical axis 4, then through the lens 6 (transmitted ray shown as A') may reach and be imaged by the test camera 2 at its measurement location without reflection by any mirrored surface 7, 8.

The introduction of such inclined mirrored surfaces 7, 8 between the lens 6 and the test camera 2 acts to extend the field of view of the measurement system 1. The mirrored surfaces 7, 8 are inclined relative to the optical axis 4 which changes the angle of some of the rays coming from the lens 6 to a wider angle as shown. This extends the image projected onto the test camera 2 for capture. This allows for measurement of the intrinsic parameters of a relatively large field of view test camera 2, such as one with a fish-eye lens for example. If the lens 6 has a 120° field of view for example, then use of such mirrored surfaces 7, 8 may extend the effective field of view to around 200, without requiring a 200 lens, which is prohibitively expensive and may add substantial distortion to the acquired image. Instead, use of the mirrored surfaces 7, 8 is able to extend the field of view of the measurement device and actually enlarges features in the acquired image, making them easier to detect and use as reference points.

The mirrored surfaces 7, 8, angled relative to the optical axis 4 of the test camera 2, cause the rays exiting the lens 6 to be reflected into the test camera's aperture at a new angle, the difference in angle being double the angle $\alpha$ of the incline of the respective mirrored surface with respect to the optical axis 4. As a specific example, if $\alpha$ equals 20°, then a test camera 2 with a field of view of +/−90° will see the features on the target corresponding to 50° at the extremes of its vision.

As an alternative example, and referring again to FIG. 1, suppose the inclination angle $\beta$ of light ray B' equals 45°. If the inclination angle $\alpha$ of mirrored surface 7 equals 20°, then the inclination angle $\theta$ of reflected light ray B" will be $\beta+2\alpha=85°$.

Figure 2:
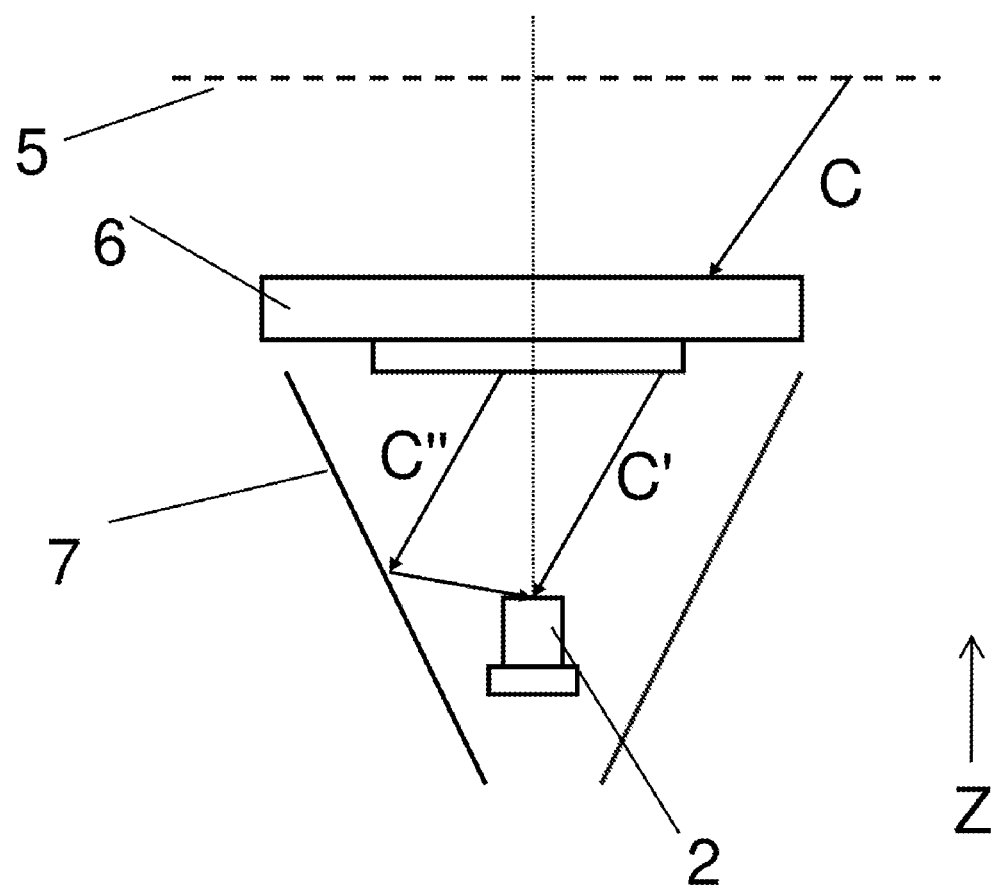
FIG. 2 schematically shows, in a sectional side view, the measurement apparatus of FIG. 1 with different light rays illustrated.

It should be noted that the measurement system 1 shown in FIG. 1 will produce an additional effect, illustrated in FIG. 2. Here it can be seen that the lens 6 will act on a light ray C which travels from the target surface 5 to produce two parallel but separated light rays C' and C". As shown, light ray C' passes directly to the test camera 2, while light ray C" passes to the test camera 2 following reflection by the mirrored surface 7. The two light rays C' and C" will appear in different regions of the test camera 2's sensor since they enter the test camera's aperture at different angles. The light ray C" will exhibit greater distortion than light ray C' since it is subject both to reflection and by virtue of its being at a relatively high field of view of the test camera 2.

As such, image features that can be used for intrinsic parameter calibration now appear all across the test camera image up to a 200° field of view. The locations of all of these features are calibrated using a reference camera as described above.

In this way, the measurement system 1 maintains the ability of known lens-based intrinsic parameter calibration systems to measure test cameras with lower fields of view without any changeover required, but in addition test cameras with fields of view of up to, for example, 200 degrees can be measured using the same measurement system 1 using a single image. It has been found that this arrangement allows for a cycle time of under 10 seconds per test camera. The measurement system is compact, and may be embodied with a footprint under 1 square meter.

The measurement system 1 does not require actuators to move the target surface 5 and does not require multiple lighting and lens setups, which makes this an inexpensive solution for wide field of view intrinsic parameter calibration. Accuracy, however, is not compromised as the positions of the measurement system 1 is fixed and measured before any test cameras are measured.

While the examples above use mirrored surfaces inclined at 20° to the optical axis 4, other angles of inclination may also be used. For example, the mirrored surfaces may be inclined to the optical by an angle in the range 50 to 80°, optionally in the range 10° to 50°, optionally in the range 15° to 30°, optionally by an angle of approximately 20°.

Figure 3:
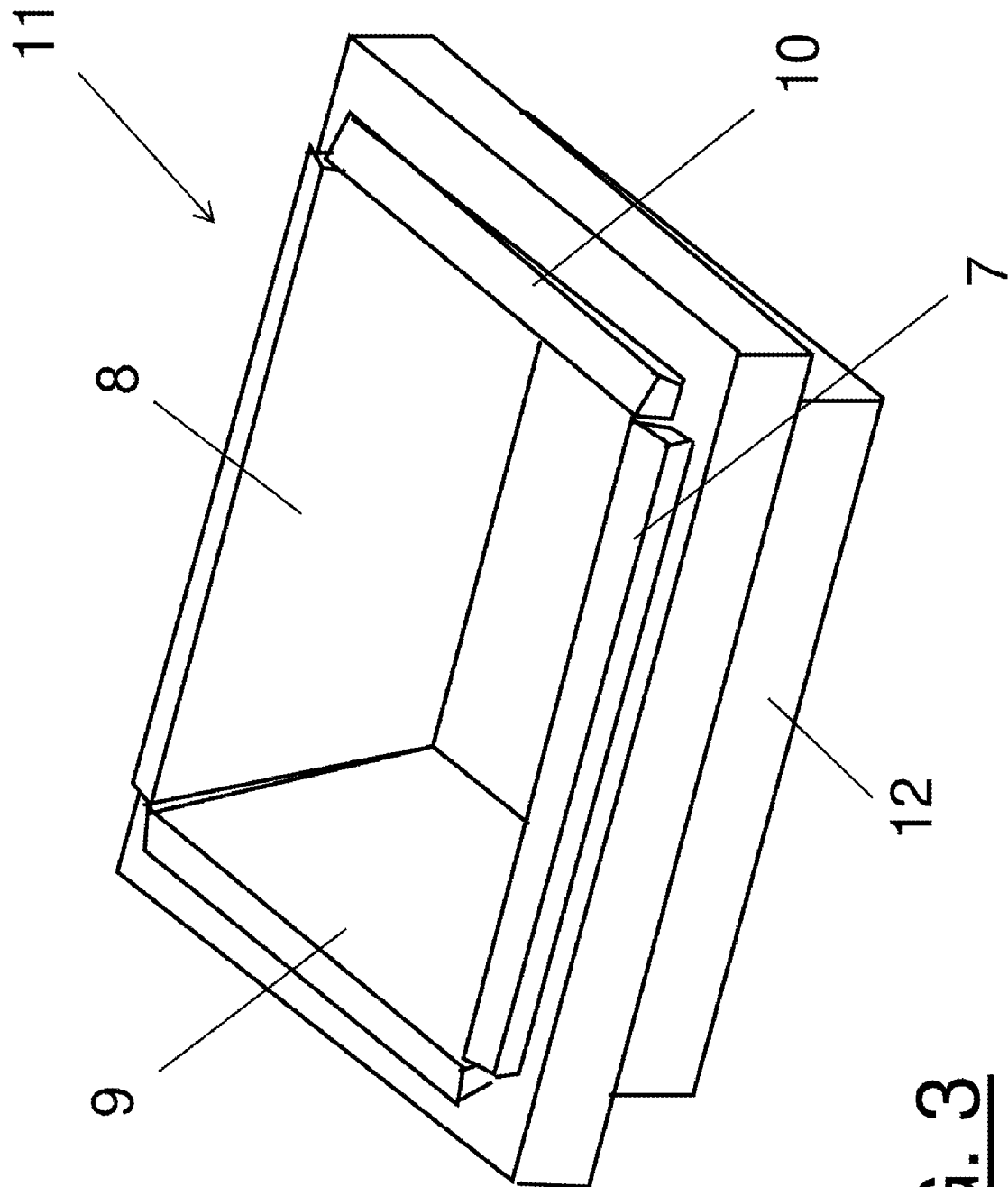
FIG. 3 schematically shows, in perspective view from above, a mirrored duct suitable for use in the measurement apparatus of FIG. 1.

There are various ways in which the measurement apparatus 1 may be provided with suitable inclined mirrored surfaces. FIG. 3 schematically shows a mirrored duct 11 suitable for use in the measurement apparatus of FIG. 1. This duct 11 would be located intermediate the lens 6 and the test camera 2 at its measurement location. The duct 11 comprises a hollow frame 12 of generally rectangular footprint, having four contiguous sidewalls. Each sidewall is configured to securely receive a respective mirror in an inclined orientation, so that the mirrored surface of each respective mirror is inclined to the optical axis 4 at the required inclination angle. In this way, four mirrored surfaces 7-10 extend almost completely around the optical axis 4, so that the field of view is extended in all directions orthogonal to the optical axis 4. The mirrored duct 11 introduces additional distortions into the acquired image, but those may also be corrected using the same reference camera method described above.

Figure 4:
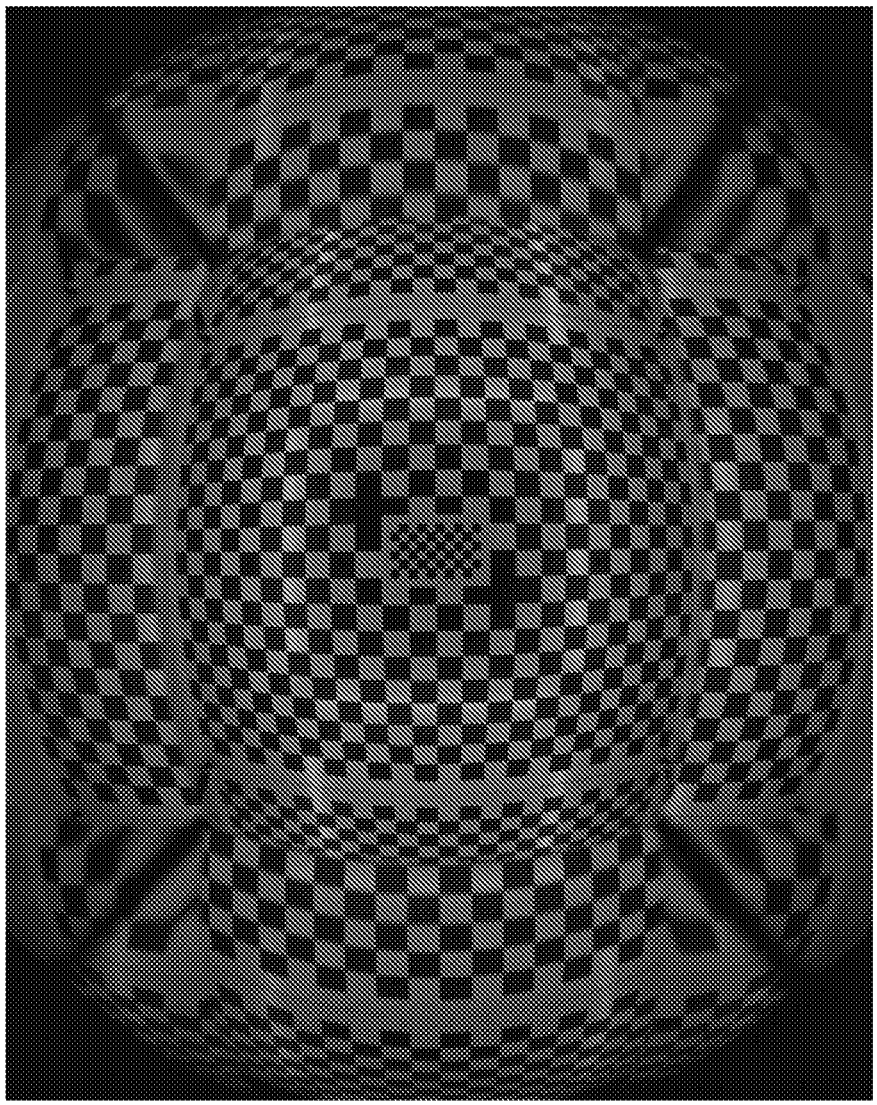
FIG. 4 shows an actual test image obtained using measurement apparatus according to the present invention.

An actual test image 13 obtained using measurement apparatus 1 according to the present invention is reproduced in FIG. 4.

The above-described embodiments are exemplary only, and other possibilities and alternatives within the scope of the invention will be apparent to those skilled in the art. For example, similar apparatus may be used to perform functions such as color testing, focus testing, glare testing for example.

REFERENCE NUMERALS USED

1—Measurement apparatus
2—Test camera
3—Support
4—Optical axis
5—Target surface
6—Lens
7, 8, 9, 10—Mirrored surfaces
11—Duct
12—Frame
13—Test image
A, A', B, B', B", C, C', C"—Light rays
α—Inclination angle of mirrored surface
β—Inclination angle of light ray B'
θ—Inclination angle of light ray B"
Z—Vertical axis

The invention claimed is:

1. Apparatus for measuring intrinsic parameters of a camera, the camera having a field of view centered about an optical axis of the camera, the apparatus comprising:
   a positioning means for locating the camera at a measurement location,
   a target surface, spaced from the camera at its measurement location along an optical path and arranged to at least partially extend across the camera's field of view,
   a lens located in the optical path between the camera at its measurement location and the target surface, and
   a mirrored surface which is inclined to the optical axis such that a light ray travelling from the target surface, then through the lens, may be reflected by the mirrored surface to reach and be imaged by the camera at its measurement location.

2. The apparatus of claim 1, wherein the mirrored surface is inclined to the optical axis by an angle in the range 5° to 80°.

3. The apparatus of claim 2, wherein the mirrored surface is inclined to the optical axis by an angle in the range 10° to 50°.

4. The apparatus of claim 3, wherein the mirrored surface is inclined to the optical axis by an angle in the range 15° to 30°.

5. The apparatus of claim 4, wherein the mirrored surface is inclined to the optical axis by an angle of approximately 20°.

6. The apparatus of claim 1, wherein the target surface intersects the optical axis,
   the light ray comprises an outer light ray which travels from an outer region of the target surface, spaced from the optical axis, and
   an inner light ray which travels from a central region of the target surface, proximate to the optical axis, then through the lens, may reach and be imaged by the camera at its measurement location without reflection by the mirrored surface.

7. The apparatus of claim 1, comprising a duct located intermediate the lens and the camera at its measurement location, and wherein a sidewall of the duct comprises the mirrored surface.

8. The apparatus of claim 7, wherein the duct comprises a plurality of contiguous sidewalls, and each sidewall comprises a mirrored surface inclined to the optical axis such that a light ray travelling from the target surface, then through the lens, may be reflected by one of the mirrored surfaces to reach and be imaged by the camera at its measurement location.

9. The apparatus of claim 1, wherein the target surface extends orthogonally to the optical axis.

10. A method for measuring intrinsic parameters of a test camera, the test camera having a field of view centered about an optical axis of the test camera, comprising the steps of:
    i) locating the test camera at a measurement location,
    ii) providing:
       a target surface, spaced from the test camera at its measurement location along an optical path and arranged to at least partially extend across the test camera's field of view,
       a lens located in the optical path between the test camera at its measurement location and the target surface, and
       a mirrored surface which is inclined to the optical axis, such that a light ray travelling from the target surface, then through the lens, may be reflected by the mirrored surface to reach and be imaged by the test camera at its measurement location, and
    iii) using the test camera to image light rays travelling from the target surface, then through the lens to the test camera, to create a test image.

11. The method of claim 10, wherein in step iii), the imaged light rays include light rays that have been reflected by the mirrored surface in addition to light rays that have travelled directly from the lens to the test camera without undergoing reflection.

12. The method of claim 10, wherein the test camera comprises a fisheye lens.

13. The method of claim 10, comprising the steps of:
locating a reference camera at the measurement position,
obtaining a reference image using the reference camera, and
comparing features visible in the reference image to corresponding features visible in the test image to calibrate the test camera.

14. A method for measuring intrinsic parameters of a camera, using the apparatus of claim 1.

\* \* \* \* \*